(12) United States Patent
Yang

(10) Patent No.: US 6,640,022 B2
(45) Date of Patent: Oct. 28, 2003

(54) LOW ANGULAR ALIGNMENT SENSITIVITY OPTICAL SWITCH

(75) Inventor: Tsung-yi Yang, Rolling Heights, CA (US)

(73) Assignee: Copley Networks, Inc., City of Industry, CA (US)

( * ) Notice: Subject to any disclaimer, the term of this patent is extended or adjusted under 35 U.S.C. 154(b) by 83 days.

(21) Appl. No.: 09/862,118

(22) Filed: May 21, 2001

(65) Prior Publication Data

US 2002/0172450 A1 Nov. 21, 2002

(51) Int. Cl.[7] .................................................. G02B 6/34
(52) U.S. Cl. ............................ 385/16; 385/18; 385/24; 385/36; 385/15; 385/25
(58) Field of Search ............................ 385/16, 18, 24, 385/36, 15, 25

(56) References Cited

U.S. PATENT DOCUMENTS

| 5,046,806 A | * | 9/1991 | Kidder et al. ................. 385/16 |
| 5,999,669 A | * | 12/1999 | Pan et al. ...................... 385/18 |
| 6,208,777 B1 | * | 3/2001 | Jing ............................. 385/16 |

* cited by examiner

Primary Examiner—Brian Healy
Assistant Examiner—Eric Wong
(74) Attorney, Agent, or Firm—Elliott N. Kramsky

(57) ABSTRACT

An optical switch includes a reflective element that may be moved into and out of the path of an input light beam without rotation about a hinge. The switch includes a right angle prism whose hypotenuse is an angularly-fixed reflective surface. The prism is fixed to a base platform that is pivotal about an underlying pivot member. A switchable electromechanical relay is energizable for selectively rotating the platform about the pivot member to move the prism in and out of the path of the input beam. A collimator fixed to the output face of the prism assures proper registration of the output with a beam when reflected.

18 Claims, 2 Drawing Sheets

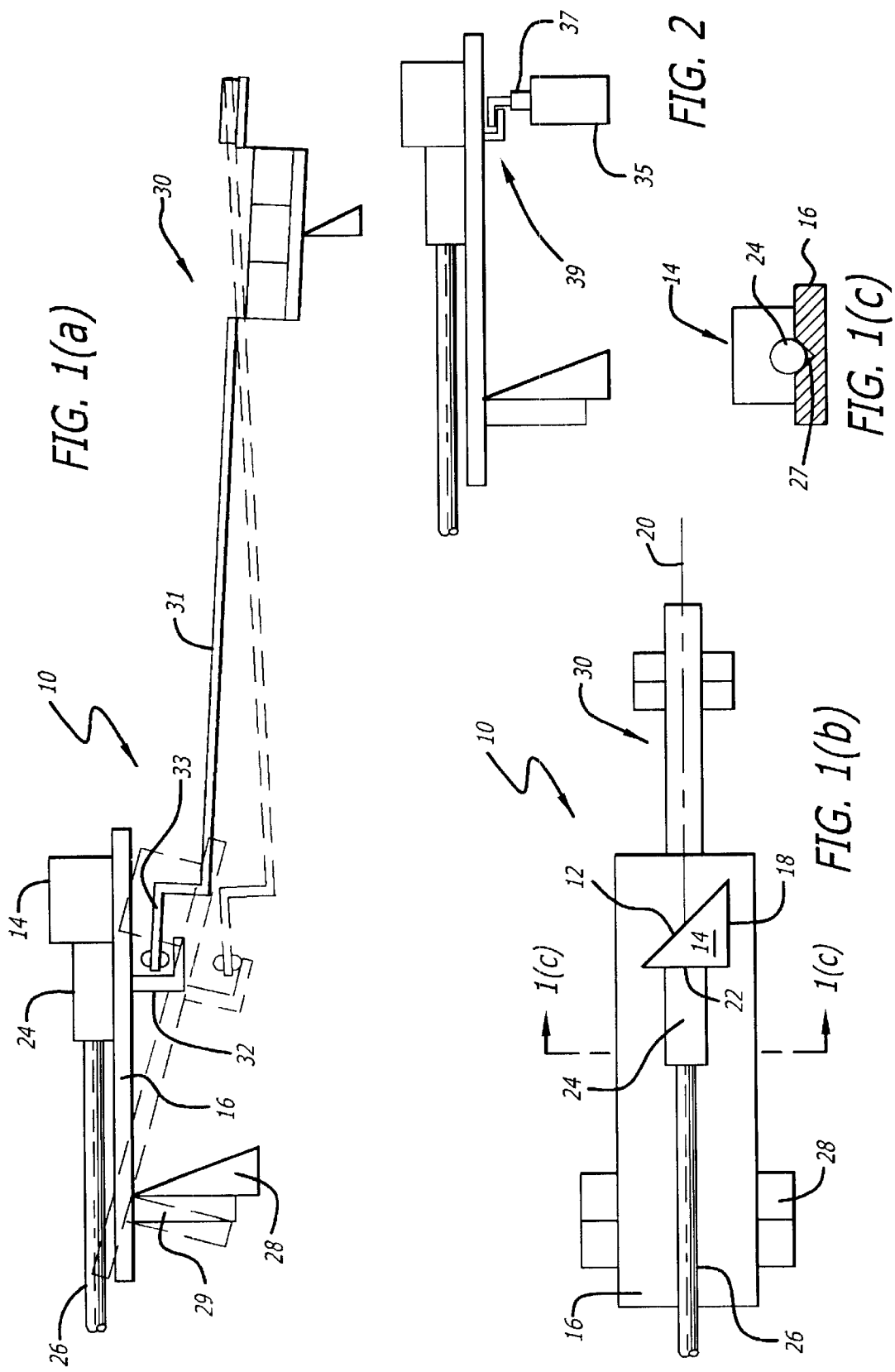

LOW ANGULAR ALIGNMENT SENSITIVITY OPTICAL SWITCH

BACKGROUND

1. Field of the Invention

The present invention relates to photonic switches. More particularly, this invention pertains to a mechanical switch suitable for incorporation into optical switching arrays.

2. Description of the Prior Art

The two primary operational modes of switching signals in an optical network are OEO (optical-electrical-optical) and photonic. They differ in that the switching function is accomplished electronically in the OEO mode while photonic switching is accomplished by the deflection of beams. Such beam deflections may be occasioned by numerous means, the most prominent of which utilizes MEMS (microelectromechanical systems) technology.

In a MEMS system, switching is accomplished by the use of mirrors whose orientations are responsive to control signals. Often a plurality of mirrors is arranged within a switching module architecture having a plurality of input and output ports. Numerous switching modules may, in turn, be grouped or cascaded together to form large switches. Examples of switching architectures include crossbar switches, Benes switches, Spanke-Benes switches and Spanke switches.

The MEMS switches that comprise switching architectures generally comprise pluralities of planar mirrors, each mirror being hinged at its bottom edge to rotate upwardly and downwardly to a preferred attitude to either intercept and redirect an input beam or to permit the beam to bypass its position without effect. The light passes through the switch in a plane that is parallel to the bottom surface of a switch housing. Movements of the mirrors between preferred attitudes are responsive to electromechanical forces.

Switching accuracy is dependent upon the repeatable, precise steering of light beams from input to output ports. Mirrors that are switched to different angular orientations about a hinge are subject to tilt bias due the difficulty of assuring return to precise "ON" and "OFF" positions. This may cause an input light beam to be deflected off-center either losing or dissipating the optical signal and causing a type of insertion loss.

In addition, should a mirror of the array require replacement, an active alignment process is required to assure that the new mirror is properly oriented. This greatly complicates the practical application of switching module architectures comprising numerous hinged mirrors.

SUMMARY OF THE INVENTION

The preceding and other shortcomings of the prior art are addressed by the present invention that provides, in a first aspect an optical switch. Such switch includes a prism. The prism has input and output surfaces. A reflecting surface connects ends of the input and output surfaces.

A substantially-planar base platform having a longitudinal axis supports the prism. A pivot member is arranged beneath the base platform and transverse to the axis of the platform so that the platform is rotatable about the member in the plane of the longitudinal axis.

Apparatus responsive to an input signal is arranged to cause the platform to be selectively rotated about the pivot member.

In a second aspect, the invention provides apparatus for selectively routing at least one input beam to a plurality of predetermined destinations. Such apparatus includes a plurality of prisms. Each prism defines a triangle in a horizontal plane with orthogonal input and output surfaces and a reflecting surface connecting each of the input and output surfaces.

A plurality of substantially-planar base platforms is provided. Each platform has a longitudinal axis and supports a prism.

A pivot member is arranged beneath each base platform and transverse to the axis of the associated platform so that the platform is rotatable about the member in the plane of the longitudinal axis.

Apparatus responsive to an input electrical signal is arranged to cause each platform to be selectively rotated about the associated member. A controller is provided for selectively energizing such apparatus whereby the attitudes of the platforms are responsive to the controller.

In a third aspect, the invention provides an optical switch. Such switch includes a reflective surface. A substantially-planar base platform having a longitudinal axis supports the reflective surface.

A pivot member is arranged beneath the base platform and transverse to the axis of the platform so that the platform is rotatable about the member in the plane of the longitudinal axis. Apparatus responsive to an input signal is arranged to cause the platform to be selectively rotated about the pivot member.

The foregoing and additional features of the invention will become further apparent from the detailed description that follows. Such description is accompanied by a set of drawing figures in which numerals, corresponding to those of the written description, point to the features of the invention. Like numerals refer to like features throughout both the written description and the drawing figures.

BRIEF DESCRIPTION OF THE DRAWINGS

FIGS. 1(a), 1(b) and 1(c) are side elevation, top planar views and cross-sectional views of an optical switch in accordance with the invention;

FIG. 2 is a side elevation of an optical switch in accordance with an alternative embodiment of the invention.

DETAILED DESCRIPTION OF THE PREFERRED EMBODIMENT

Figure 3:
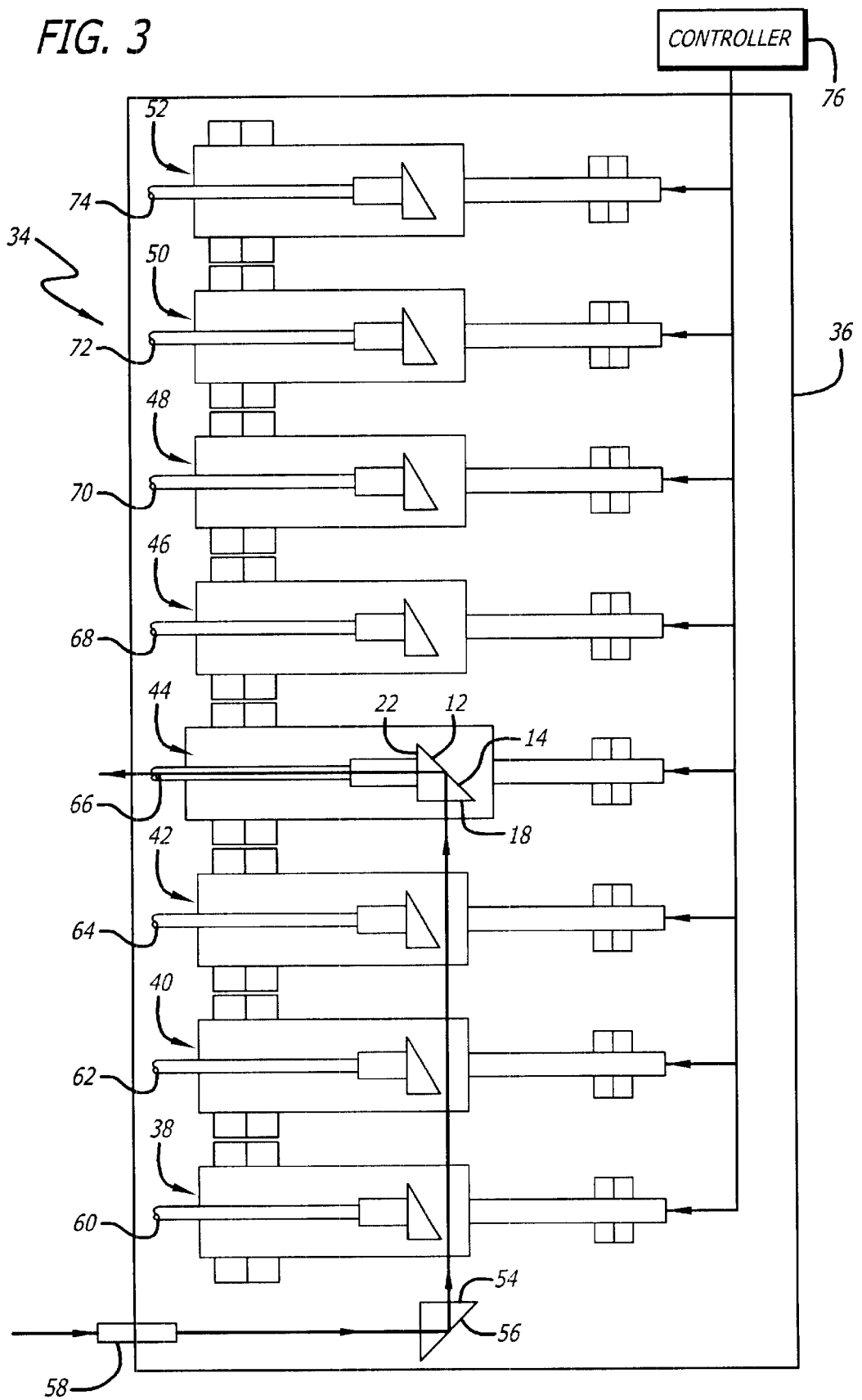
FIG. 3 is a schematic view of a 1×8 switch incorporating optical switches in accordance with the invention.

FIGS. 1(a) and 1(b) are side elevation and top planar views, respectively, of an optical switch 10 in accordance with the invention. The switch 10 differs from conventional photonic switches in that the reflective element is not hinged and therefore not subject to misalignment error due to the difficulty of repeatably returning a hinged mirror to precise alignment.

In the switch 10 of the invention, the reflective element comprises the hypotenuse face 12 of a right angle prism 14. (While the reflective element of the invention is illustrated as the hypotenuse face 12 of a right angle prism 14, the face 12 may equally comprise a stand-alone planar mirror of like orientation in the discussion that follows.) The prism 14 is mounted onto a base platform 16 adjacent an end thereof with an input face 18 parallel to the longitudinal axis 20 of the platform 16 and an output face 22 orthogonal to the axis 20.

An elongated collimator 24 is fixed orthogonal to the output face 22 to assure that a light beam reflected from the hypotenuse face 12 will always be properly directed to an output fiber 26. As the angular orientation of the reflective hypotenuse face 12 is fixed with respect to the input and output faces 18, 22 and the collimator 24 is fixed to the output face 22 in alignment with the fixed exit axis, the reflective face 12 is always precisely properly aligned to direct reflected light into the output fiber 26. In addition, as illustrated in FIG. 1(c), a cross-sectional view taken at line 1(c)—1(c) of FIG. 1(b), a v-groove 27 within the top surface of the platform 16 and aligned with the longitudinal axis 20 receives the bottom portion of collimator 24 (to which it is adhesively fixed) to further assure its proper alignment (as well as the alignment of the prism 14 to which it is fixed) in the horizontal plane. As a result, precise and repeatable reflective surface alignment is obtained in accordance with the present invention.

Rather than attempting to return a hinged reflective surface to a predetermined attitude, in the present invention a fixed orientation reflective surface is controllably "dropped" out of and inserted into the path of an input light beam to accomplish photonic switching. This affects a translation, as opposed to rotation of the reflective surface that assures that, when inserted into a light path, the beam is always properly redirected.

The mechanism for inserting and removing the reflective surface into the path of a light beam includes a pivot member 28 that underlies the base platform 16 at a distance removed from the end region that underlies the prism 14. A stop 29 is fixed to the bottom of the platform 16 to abut the member 28 when it is rotated to horizontal ("ON" position of the switch 10). At the same time, an electromechanical relay 30 with attached extension arm 31 is arranged to contact the base platform 16 in the region that underlies the prism 14 and collimator 24. A hook 32 fixed to the bottom of the platform 16 in such region interacts with the end 33 of the extension arm 31. The hook arrangement permits the switch 10 to operate in either the vertical (as illustrated) or horizontal plane where gravity cannot cause the platform 16 to follow all movements of the extension arm 31.

The relay 30 may comprise, for example a device that is commercially available from Aromat under product designation "NAIS Relay" and part number 00908. Other commercially available devices, such as a vertical movement solenoid may be equivalently employed in place of a relay. As illustrated in FIG. 2, in an alternative embodiment, an optical switch in accordance with the invention may utilize a solenoid 35 with upwardly-directed ram 37 and hook attachment 39 as apparatus for rotating the attitude of the platform 16.

FIG. 3 is a top plan view of a 1×8 photonic switch 34 with top housing panel removed, that employs a plurality of optical switches in accordance with the invention. The mechanisms of the switch are arranged within the housing 36 as shown. Eight switches 38 through 52 in accordance with the invention are arranged so that the longitudinal axes of their base platforms and reflective hypotenuse surfaces of their prisms are parallel to one another. An optical relay 54 comprising a forty five degree prism with reflective surface 56 orthogonal to those of each of the optical switches 38 through 52 is provided for receiving and redirecting a beam input at an input port 58. The relay 54 allows the switch 34 to be compactly arranged with all ports, input port 58 and output ports 60 through 74 aligned at a single side 76 of the housing 36.

In operation, an input light is input to the switch 34 at the port 58 and selectively directed the output ports (with associated output fibers) by the inputting of a signal from a controller 76 to the relays associated with (and underlying) the platforms of the switches 38 through 52. When "OFF", the armature of a relay (or the ram of a solenoid) is retracted to permit the overlying base platform and prism to rotate to the bottom of the housing 36 under the force of its own weight (as illustrated in shadow outline in FIG. 1(a)). This effectively removes the reflective surface of the prism of the particular switch from the path of the redirected input beam (which propagates in a plane parallel to the top and bottom surfaces of the housing 36). When "ON", the associated relay (or solenoid) is energized to raise the overlying base platform and prism to insert the reflective hypotenuse surface of the prism into the path of the reflected input beam.

As the reflective surface of each prism provides an orientation that is angularly fixed in the plane of transmission of the input beam, a forty five degree reflective surface is reliably and repeatably presented to the input light beam. And, as the associated collimator is fixed with respect the reflective surface, the output beam is reliably directed to the output port designated by the controller 76.

Additionally, the failure of one or more of the switches of the 1×8 optical switch 34 can be repaired by the simple replacement of the switch element including prism and platform with another without any need for an active alignment process. This is accomplished in a straightforward manner requiring no active fine tuning due to the fact that the angular position of the switch element is always fixed at the proper angle. This leaves only the less-critical insertion process that involves rotation of the base platform to translate the angularly-fixed prism into and out of the light path. Such rotation process does not require fine tuning as the direction of beam travel is essentially relatively insensitive to small deviations of base platform from absolute level in the ON state.

Thus it is seen that the present invention provides an improved photonic switch. By utilizing the teachings of this invention, one can obtain reliable land repeatable positioning of the critical reflective surface of a switch element and, at the same, replace switch elements when necessary without having to undergo arduous and time-consuming active alignment processes.

While this invention has been presented with reference to its presently-preferred embodiment, it is not limited thereto. Rather, this invention is limited only insofar as it is defined by the following set of patent claims and includes within its scope all equivalents thereof.

What is claimed is:

1. An optical switch comprising, in combination:
   a) a prism defining a triangle in a horizontal plane and having orthogonal input and output surfaces and a reflecting surface connecting ends of said input and output surfaces;
   b) a collimator lying in said horizontal plane and fixed to the output surface of said prism;
   c) a substantially-planar base platform having a longitudinal axis and supporting said prism;
   d) a pivot member arranged beneath said base platform and transverse to said axis of said platform so that said platform is rotatable about said member in the plane of said longitudinal axis; and
   e) apparatus responsive to an input signal arranged to cause said platform to be selectively rotated about said member.

2. An optical switch as defined in claim 1 wherein said prism is a right angle prism.

3. An optical switch as defined in claim 1 further including:
   a) said collimator having an elongated body; and
   b) one end of said body being fixed to said output surface.

4. An optical switch as defined in claim 3 further including an output optical fiber fixed to the other end of said body.

5. An optical switch as defined in claim 4 wherein said body is fixed to said fiber and to said output surface by means of optical cement.

6. An optical switch as defined in claim 1 further including:
   a) said prism having top and bottom surfaces; and
   b) said bottom surface of said prism being remote from said member so that said collimator body is substantially aligned with said longitudinal axis of said platform.

7. Apparatus for selectively routing at least one input beam to a plurality of predefined destinations comprising, in combination:
   a) a plurality of prisms, each prism defining a triangle in a horizontal plane and having orthogonal input and output surfaces and a reflecting surface connecting ends of said input and output surfaces;
   b) a collimator lying in said horizontal plane and fixed to the output surface of said prism;
   c) a plurality of substantially-planar base platforms, each platform having a longitudinal axis and supporting a prism;
   d) a pivot member arranged beneath each base platform and transverse to the axis of the associated platform so that said platform is rotatable about said member in the plane of said longitudinal axis;
   a) apparatus responsive to an input signal arranged to cause each platform to be selectively rotated about said member; and
   e) a controller for selectively energizing said apparatus whereby the attitudes of said platforms are responsive to said controller.

8. Apparatus as defined in claim 7 wherein said prism is a right angle prism.

9. Apparatus as defined in claim 7 further including:
   a) said collimator having an elongated body; and
   b) one end of said body being fixed to said output surface.

10. Apparatus as defined in claim 9 further including an output optical fiber fixed to the other end of said body.

11. Apparatus as defined in claim 10 wherein said body is fixed to said fiber and to said output surface by means of optical cement.

12. Apparatus as defined in claim 9 further including:
   a) said prism having top and bottom surfaces; and
   b) said bottom surface of said prism being remote from said member so that said collimator body is substantially aligned with said longitudinal axis of said platform.

13. An optical switch comprising, in combination:
   a) a reflective surface;
   b) a substantially-planar base platform having a longitudinal axis, said base platform supporting said reflective surface;
   c) a pivot member arranged beneath said base platform and transverse to said axis of said platform so that said platform is rotatable about said member in the plane of said longitudinal axis;
   d) a collimator fixed within a longitudinal groove in said base platform whereby said collimator is movable with said reflective surface; and
   e) apparatus responsive to an input signal arranged to cause said platform to be selectively rotated about said member.

14. An optical switch as defined in claim 13 further including:
   a) said collimator having an elongated body; and
   b) said longitudinal groove being generally v-shaped.

15. An optical switch as defined in claim 14 further including an output fiber fixer to one end of said body.

16. An optical switch as defined in claim 15 wherein said body is fixed to said output fiber by means of optical cement.

17. An optical switch as defined in claim 3 further including:
   a) said elongated body being cylindrical; and
   b) said platform having a groove aligned with said longitudinal axis for receiving a portion of said elongated body.

18. An optical switch as defined in claim 15 wherein said reflective surface comprises a mirror.

* * * * *